March 29, 1966   A. C. DANNETTELL   3,243,681
TRANSISTORIZED SPEED CONTROL FOR INDUSTRIAL TRUCK
Filed Nov. 26, 1962   2 Sheets-Sheet 2
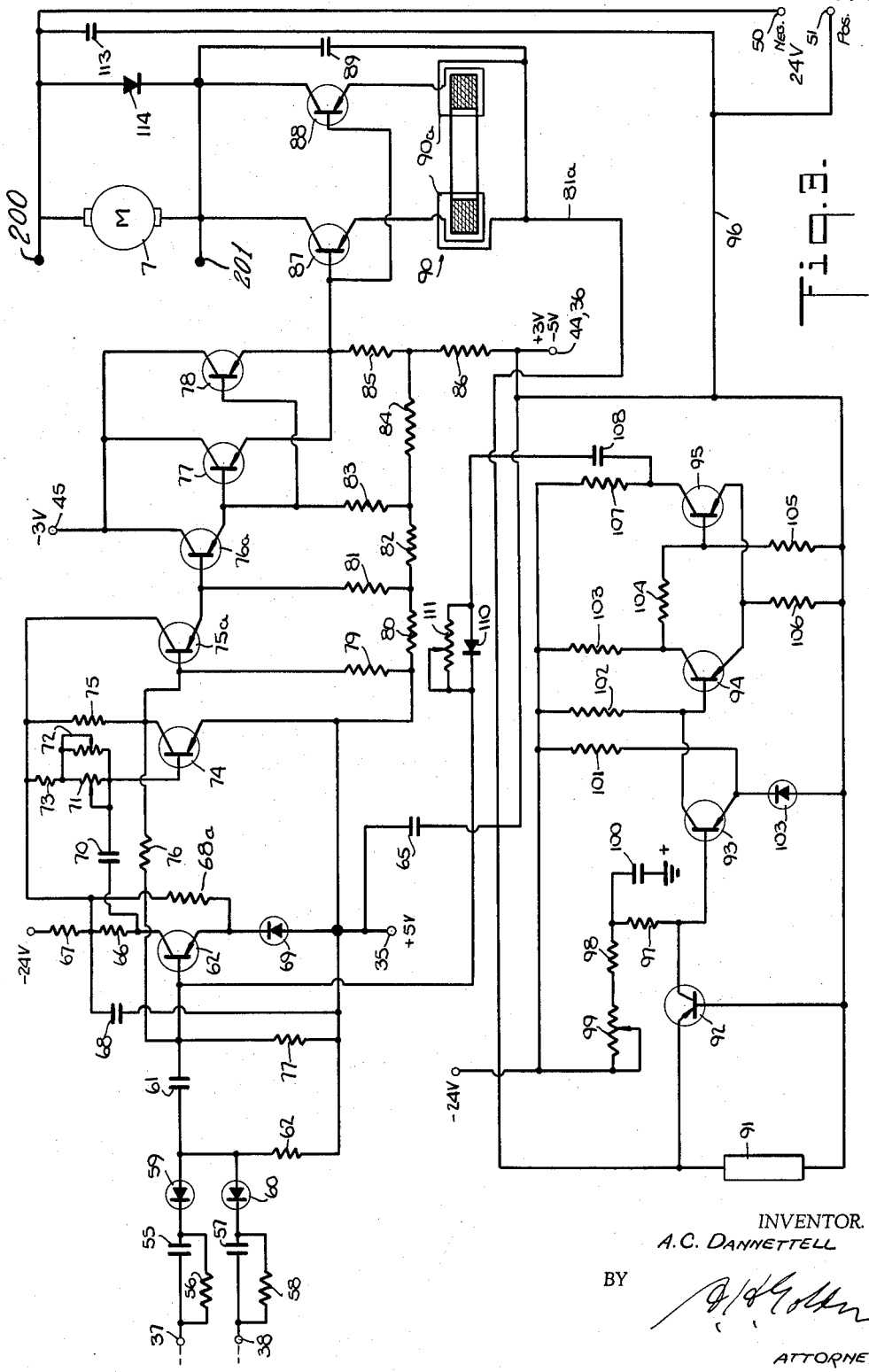
INVENTOR.
A.C. DANNETTELL
BY
ATTORNEY United States Patent Office 3,243,681
Patented Mar. 29, 1966

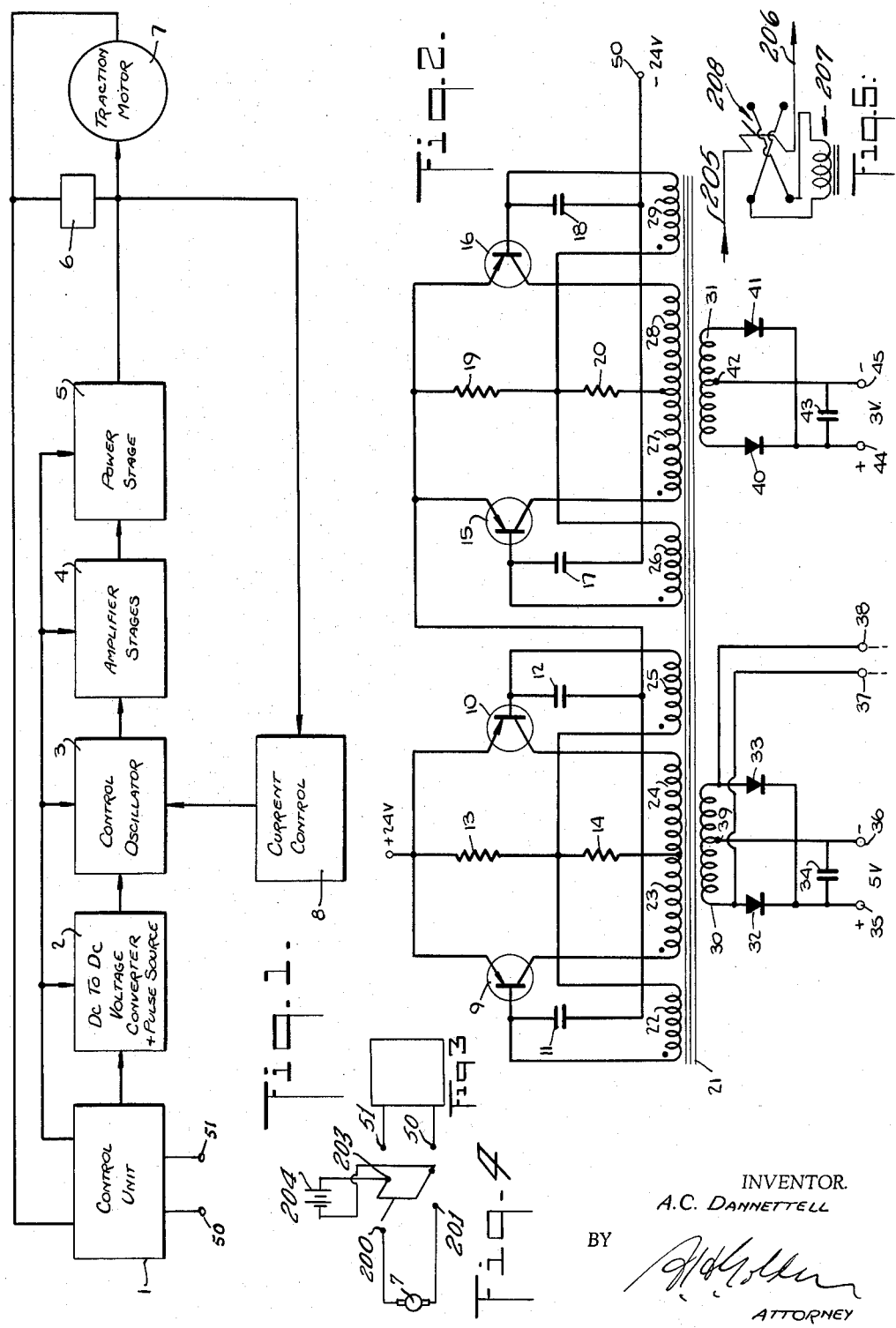

3,243,681
TRANSISTORIZED SPEED CONTROL FOR
INDUSTRIAL TRUCK
Alan C. Dannettell, Philadelphia, Pa., assignor, by mesne
assignments, to Yale and Towne, Inc., New York, N.Y.,
a corporation of Ohio
Filed Nov. 26, 1962, Ser. No. 239,959
13 Claims. (Cl. 318—332)

My invention relates to motor control systems and more particularly to a fully transistorized control system which provides precision control of the traction motor of an industrial truck, without the loss of power and resulting inefficiency due to dissipation of power in resistive components.

In battery operated industrial trucks, one of the problems has been to achieve the maximum amount of work, with close and accurate control of the truck, while operating with the greatest efficiency so to conserve battery power. In addition, proper safeguards must be provided to prevent damage to the truck or its load, or to persons on or near the truck.

Economic considerations make it imperative that an industrial truck be capable of operating for a certain period of time, as for one day or work shift, while having a reserve of power that can be used after the truck has performed a normal amount of work. If the truck does not have reserve power, the truck may not operate when needed, and may even have to be taken out of service during the normal working period. It is entirely impractical to take a truck out of service merely to charge its battery, since that seriously impairs the utility of the truck. On the other hand, a more efficient use of the battery capacity will increase the power reserve, and will enhance the value of the truck to a very considerable degree.

Since the traction motor in a truck of the type discussed must deliver large amounts of power at high torque and be capable of close control, it is customary to utilize D.C. motors of the series type, with power for controlling the motor speed.

Over various parts of the operating range of the motor, the power consumed is divided between that used by the motor to perform useful work, and that dissipated by the resistors used for control. That portion of the power consumed in the resistors, although necessary for control, does not contribute to the useful work output. This causes lowered efficiency of the industrial truck and reduction of the amount of time the truck can remain in operation without a battery recharge. Also, power resistors of sufficient capacity usually take up a considerable amount of space on the truck, and generate unwanted heat.

Another disadvantage of utilizing resistors to control the traction motor is that the motor speed will change for varying loads at various speed settings. This is due to the fact that there is a change in the voltage drop across the resistors because of the changing current as the load varies.

Another source of power loss and inefficiency in electric industrial trucks is the utilization of voltage dropping resistors to provide the low voltage high currents needed in the various circuits of the control system. These resistors must also be relatively large, and dissipate large amounts of power in the form of heat. As an alternative to the use of dropping resistors, it has been suggested that low voltages could be taken across certain cells of the battery. However, that is not satisfactory because it imposes a greater load on certain cells, which will not receive their full charge on recharging the battery.

The novel industrial truck control system that I have conceived by my invention will have very positive advantages over the systems of the prior art, as will appear.

It is an object of my invention to provide a control system for industrial truck traction motors which will provide close control and high operating efficiencies, with proper safeguards to prevent damage to equipment and personnel.

Another object of my invention is to provide a fully transistorized control system for traction type D.C. motors which provides close speed control without the dissipation of large amounts of power.

A further object is to provide a fully transistorized control system for D.C. traction motors which provides its own low voltage control potentials for its own circuits from a higher voltage battery without the dissipation of large amounts of power through dropping resistors.

A still further object of my invention is to provide a fully transistorized pulse modulated control system which automatically limits the current drawn by the motor when it exceeds a predetermined level.

In carrying out my invention, I prefer to utilize pulses of square wave shape to provide the driving power for the traction motor. I control the speed of the motor by varying the time duration or duty cycle of the pulses. A diode connected across the input terminals of the motor provides a path for the motor current during the time interval that no pulse is provided.

I obtain the power pulses for driving the traction motor from a suitable transistor wave generator or oscillator having manual means to control its pulse duration. One or more transistor stages amplify the pulses from the oscillator to a level suitable to drive a power stage in which there is a group of paralleled power transistors, which in turn supply the traction motor. Sensing means monitor the motor current, and operate through a control circuit which in turn varies the pulse duration time of the oscillator. This results in automatic control of the motor by controlling the effective current to the motor within a predetermined safe limit. The automatic control feature is effective to prevent damage when the truck driver attempts to plug the traction motor, and permits automatic acceleration up to a speed set by the driver by means of the manual control. It also contributes precise control while allowing the motor to develop the best possible torque during "inching" of the truck.

The automatic control will act in my system to prevent sudden acceleration of the truck due to failure of circuit components. Since the speed of the motor is controlled by the average value of the power pulses supplied to it, there is no need for a series field resistor which dissipates large amounts of power, and my system conserves the power for useful purposes. Furthermore, there is no speed regulation problem, as would be caused by the changing voltage drop of a series field resistor.

Another problem solved by my invention is the elimination of a voltage dropping resistance to provide the transistor amplifiers with the low voltage high current power they require. I accomplish this by the use of a D.C. to D.C. voltage converter in which an oscillator changes the battery voltage to a pulsating voltage. Then by using a transformer with multiple windings, voltages of desired levels are obtained. The reduced pulsating voltages are then rectified to supply the various transistor stages with the low voltages they require.

Therefore, it will be seen that I eliminate motor field series resistors and dropping resistors that waste large amounts of power without productive result, and I contribute a more efficient system which enables an industrial truck to have a larger power reserve, and to do more work before its battery requires recharging.

The nature of my invention and its various features and objects will appear more fully and be better understood from a consideration of the following description, when read in connection with the drawings wherein:

FIG. 1 is a block diagram of the system.

FIG. 2 is a schematic diagram of the D.C. to D.C. voltage converter and pulse source portion of my invention.

FIG. 3 is a schematic diagram of one embodiment of my invention.

FIG. 4 is a block diagram illustrating the selective switching of the battery directly to the motor for maximum power or to the motor control system, and FIG. 5 is an electrical schematic diagram illustrating one manner of reversing the energization of the field winding.

Referring now to FIG. 1 showing the essential elements of my system in block form, the control unit 1 represents the various controls and switches employed with my system such as a main switch, speed control, reversing control, full load bypass switch and other controls to be described hereinafter.

The block designated 6 contains means acting in conjunction with the control unit to place the motor directly across the battery and disconnect the control system when desired. The control unit is connected to battery voltage, as for example 24 volts from terminals 50 and 51, and supplies the voltage to the D.C. to D.C. converter and pulse source unit 2 which in turn provides reduced D.C. voltages, as for example 3 volts and 5 volts, to operate the various transistor stages. Although single lines are shown coming out of the converter 2, it will be clear from the drawings and explanation to follow that they represent multiple lines feeding the various voltages required by the transistor stages in the system.

The control oscillator 3 produces a square wave of relatively constant amplitude whose duty cycle is varied to provide control of the motor 7. The amplifier 4 takes the square wave generated by the control oscillator 3 and amplifies it to a sufficient power level to drive the power stage 5 which consists of a group of high current power transistors connected in parallel to provide the pulse power necessary to drive the motor 7. The amplifier stage 4 also performs the task of matching the high impedance output of the control oscillator 3 to the low impedance input of the power stage 5. The current control 8 monitors the current drawn by the motor 7 and maintains it within safe limits by automatically varying the duty cycle of the control oscillator 3.

Referring to FIG. 2, which is a schematic diagram of the D.C. to D.C. voltage converter and pulse source shown in block 2 of FIG. 1, the transistors 9 and 10 with their associated capacitors 11 and 12, and the resistors 13 and 14, control the primary windings 22, 23, 24 and 25 in a transformer 21. A similar arrangement of transistors 15 and 16 with their associated capacitors 17, 18 and resistors 19, 20, control primary windings 26, 27, 28, 29 so that transistors 15, 16 act along with transistors 9, 10 to produce square wave pulses in the transformer 21.

These pulses appear as A.C. square waves across the secondary windings 30 and 31.

In the case of secondary winding 30, a square wave output is taken directly across the ends of the secondary winding and fed to terminals 37 and 38 shown in FIG. 3. Also, rectifiers 32 and 33, FIG. 2, convert a part of the A.C. wave output from winding 30 to a D.C. voltage at terminals 35, 36. The capacitor 34 connected between the output of rectifier 32 and the center tap 39 of the secondary 30 provides filtering to reduce any ripple present to a safe level.

Rectifiers 40, 41 connected to transformer secondary 31, in conjunction with the filter capacitor 43, provide a second source of D.C. at terminals 44, 45 to be used to operate the various transistor stages.

For illustrative purposes only, the embodiment shown provides 5 volts at 5 amperes D.C. across terminals 35 and 36, while 3 volts D.C. at 100 amperes is provided at terminals 44 and 45. It is to be noted that the high current output at low voltages is achieved without the use of dropping resistors which waste large amounts of battery power. In addition, it will be unnecessary to unbalance the truck battery by drawing low voltage from merely certain battery cells.

Referring now to FIG. 3, the alternating square wave appearing at terminal 37 is applied to the diode 59 through a resistor capacitor network consisting of resistor 56 and capacitor 55, which perform both a coupling and wave shaping function. The square wave on terminal 38 is similarly fed through and shaped by the resistor 58 and the capacitor 57 and then fed to diode 60. The diodes 59 and 60 are poled so that only the negative portion of the square waves appears across resistor 62a. Therefore, negative pulses are fed through capacitor 61 to the base of transistor 62. In the embodiment shown, the repetition rate of the negative pulses is 400 c.p.s.

The transistors 62 and 74 are arranged to operate as a retriggerable delay flop. The collector of transistor 62 is connected through a resistor 66 to a dropping resistor 67, which in turn is connected to the −24 volt unidirectional source of potential. A capacitor 68 enables A.C. signals to bypass transistor 62 to the 5 volt source, that source being utilized as a common point in the circuits. A bypass condenser 65 is connected across the 5 volt source.

The output signal from transistor 62 is fed through the capacitor 70 and part of the potentiometer 71 to the base of transistor 74. The resistor 73 is connected between the potentiometer 71 and the junction of resistors 66 and 67. Another potentiometer 72, used merely for purposes of adjustment, is connected in parallel with potentiometer 71. The output of transistor 74 is taken across the resistor 75 which is connected between the collector of the transistor 74 and the junction of resistors 66 and 67. An output from the collector of transistor 74 is fed back via resistor 76 to the base of transistor 62.

A resistor 68a is connected between the emitter of transistor 62 and the junction of resistors 66 and 67. Also, a diode 69 is connected between the common 5 volt circuit point and the junction of resistor 68a with the emitter of transmitter 62, clamping the emitter at a predetermined voltage level.

Now, considering the operation of the delay flop, transistor 62 is so biased that under steady state conditions it is in the non-conductive or "OFF" condition.

Transistor 74 is under steady state conditions in the normally "ON" or conducting condition. When a negative pulse arrives at the base of transistor 62, it causes the transistor to change from the non-conducting to the conducting condition, thereby producing at its collector a positive pulse which is applied through the capacitor 70 and the potentiometer 71 to transistor 74. The positive pulse at the base of transistor 74 causes that transistor, which was in a conductive state, to go into a non-conductive state, thereby producing a negative pulse at its collector.

The length of time that transistor 74 is in the non-conductive state and which determines the time duration of the negative output pulse is controlled by the time constant of the RC circuit formed by capacitor 70, the potentiometers 71, 72, and associated resistances. When capacitor 70 charges, transistor 74 returns to its conducting or "ON" state feeding back a positive signal to the base of transistor 62 which turns this transistor "OFF" until the next negative pulse arrives from the pulse source 2. The time constant of the RC circuit and the time duration of the output pulses from the delay flop will be manually controlled by varying the setting of potentiometer 71. This potentiometer then becomes the manual speed control for the motor control system.

The potentiometer 72 is of lower value than potentiometer 71, and is used to adjust the circuit for variations due to the tolerances that are allowed in the manufacture of commercial transistors, resistors and other components.

At this point, it should be emphasized that while a delay flop triggered by pulses obtained from the power supply has been described, any oscillator circuit producing square waves whose duty cycle can be controlled, such as a multivibrator or other relaxation type circuit, can be utilized. The term "oscillator" used in this application is meant to include all such circuits.

The square wave output signal from transistor 74 taken across resistor 75 is then fed to the series of grounded collector stages consisting of transistors 75a, 76a and the paralleled transistors 77 and 78 for amplification. The grounded collector configuration was selected to match the high impedance output characteristic of the oscillator stage to the low impedance input of the power amplifier stage. The resistors 80, 82, 84, and 86, which are connected between the +3, −5 voltage source and the resistors 79, 81, 83 and 85, provide for stabilization of the amplifier series. The +3 v., −5 v. designation is used since the corresponding terminals 44, 36 are connected at a single point in the particular embodiment shown in FIG. 3.

The input signal to transistor 75a appears across resistor 79 connected between the base of transistor 75a and the +5 volt source. Resistors 81 and 83 are the emitter load resistors for transistors 75 and 76a.

Resistor 85 serves as the emitter load for the paralleled transistors 77 and 78 which drive the power stage consisting of the paralleled power transistors 87 and 88.

While only two power transistors 87, 88 are actually shown, it is to be understood that the number of parallel power transistors will be that which is necessary to supply power to the particular traction motor.

All of the power stage base elements are connected in parallel to the emitters of transistors 77, 78. The collectors of all the power transistors 87, 88 are connected together, as are all their emitters. A capacitor 89 is connected across the paralleled power transistors to improve the wave shape of the output pulses.

When transistors are connected in parallel, unequal division of the current carried by them is possible even though they be of the same specification, due to inherent differences in their parameters. To prevent unequal sharing of the current load with its possible disastrous results, I provide the special transformer 90 shown in section in FIG. 3. I prefer to construct the transformer 90 with a toroid of suitable transformer material, around which is wound one coil 90a for each of the two or more power transistors 87, 88. All coils 90a have the same number of turns. The emitter of each power transistor 87, 88 is connected to one end of the transformer coil 90a that is assigned to it, and the other end of each coil 90a is connected to a lead 81a which is fed from the positive power terminal 51 through a sensing element 91 and line 96. Since a transformer causes the same amount of current to flow in each of several windings having the same number of turns and an equivalent load, then the transformer windings 90a will force one another to carry equal current. Thus, each of the paralleled transistors 87, 88 share the load equally. Capacitor 113 is connected across the terminals 50 and 51 and improves the waveform of the signals for the power stage and provides protection for the traction motor 7.

The sensing element 91, to which I have referred, is utilized in a control circuit including transistors 92, 93, 94, 95 and their associated components, FIG. 3, represented by the current control block 8 of FIG. 1. The function of this control circuit is to continually sense or monitor the current drawn by the motor. If the motor current tends to exceed a predetermined limit, the circuit produces correcting signals which vary the pulse duration or duty cycle of the delay flop to keep the current drawn by the motor within the predetermined limit.

Now, considering the current control circuit in detail in FIG. 3, the sensing element 91 is placed in the line 96 carrying power from the battery terminal 51 to line 81a and the emitters of power stage transistors 87 and 88. The sensing element location is not critical. It can be located anywhere in the circuit as long as it senses the current drawn by the motor or by any circuit supplying motor current. The sensing element 91 can be, for example, a resistor of a value to produce a suitable voltage drop while capable of carrying the necessary current. I have found it convenient to use an ammeter shunt for this purpose.

The voltage developed across the sensing element 91, when the current flows through it, is applied to the emitter element of transistor 92. The collector of transistor 92 is connected through the collector load resistor 97, the dropping resistor 98 and the variable resistor 99 to a source of negative potential. A capacitor 100 connected to the junction between resistors 97 and 98 bypasses A.C. signals to positive ground at this point. Transistor 92 with its associated components operates as a voltage amplifier with the parameters so chosen that it is normally in a conductive state unless the voltage appearing across the sensing element 91 reaches a predetermined level. The variable resistor 99 is used to adjust the level at which transistor 92 becomes non-conductive, setting the transistor for response to a predetermined signal level developed across the sensing element 91.

The output signal from transistor 92 is taken from its collector and fed to the base of the transistor 93 which operates as a voltage amplifier stage. Resistor 102 is connected between the collector of transistor 93 and a source of negative potential, and is the collector load resistor for this stage. Resistor 101 is connected between the emitter of transistor 93 and the source of negative potential, and provides bias voltage for the emitter. The rectifier 103 maintains a fixed bias on the emitter of the transistor 93. The parameters of this amplifier stage are so selected that the transistor 93 is in the non-conducting stage in the absence of an output signal from transistor 92.

The output from the collector of transistor 93 is fed to the base of transistor 94. The collector load resistor 103a is connected between the collector of transistor 94 and a source of negative potential. A further resistor 104 is connected from the collector of transistor 94 to the base of transistor 95, and also through resistor 105 to the positive 24 volt power line 96.

Resistor 106 is common to the emitters of both transistors 94 and 95, and is connected between those emitters and line 96.

The collector load resistor 107 is connected between the collector of transistor 95 and the source of negative potential. The output from transistor 95 is taken from its collector through a capacitor 108 and a network formed by the diode 110 and the variable resistor 111 and fed to the base of transistor 62. The diode 110 is poled to pass positive pulses from the transistor 95. Transistors 94 and 95 with their associated components operate as a trigger circuit.

The parameters associated with transistors 94 and 95 are chosen so that in the absence of signals below a predetermined level at the sensing element 91, transistor 94 is in a conductive state while transistor 95 is in a non-conductive state.

The operation of the current control circuit is as follows:

When the signal across the sensing element 91 reaches a predetermined level, it causes transistor 92 which is normally "ON" to assume a non-conducting state producing a negative pulse at its output. The negative pulse applied to transistor 93 causes this transistor to go from normally "OFF" to an "ON" condition producing at its output a positive pulse. The positive pulse applied to transistor 94 causes it to go from an "ON" condition to an "OFF" state producing a negative pulse. This negative pulse causes transistor 95 to go from its normally "OFF" state to an "ON" condition which in turn produces a positive pulse which is applied to the base of transistor 62.

It will be recalled that a positive signal applied to the base of transistor 62 will cause this transistor to assume its "OFF" condition. This in turn causes transistor 74 to reassume its normally "ON" condition thereby shortening the duration of the output pulse from transistor 74. This, of course, results in a decrease in the average current fed from the transistor power stages to the traction motor, in effect reducing the motor load. This process continues until the sensing element 91 senses that the current through the traction motor 7 no longer tends to exceed the level that has been predetermined. When that happens, sensing element 91 no longer supplies the signal that will affect transistor 92, and the control circuit becomes inoperative until the motor current again reaches the predetermined level.

The level of the output signal from the current limiting stages can be adjusted through the variable resistor 111. That adjustment will be used to compensate the tolerances found in the commercial components of the current control circuit.

At this point, it should be mentioned that through the utilization of my invention and the circuit configuration shown, square waves having very steep leading and following edges are obtained and used throughout the circuit for switching. This results in very high efficiency of my system, since by switching the transistors very quickly through their active operating region, where the power dissipation is greatest, I achieve a minimum loss of power at the transistors.

Referring again to FIG. 3, I connect a diode 114 across the traction motor 7, with its polarity opposite to battery polarity, thus providing an alternate path for current flow through the motor during the time interval between pulses. Diode 114 also will absorb the damaging high voltages produced by the traction motor, as when the industrial truck drives the motor while going down a grade or coasting, thus protecting the transistors in the power stage from excessive voltage or reverse polarity.

To save further power and increase the length of service on a battery charge, I may utilize means well known in the art and forming part of control block 1, FIG. 1, to disconnect the entire control system from the truck battery and at the same time operate the traction motor directly from the battery at full load when no speed control is required. An illustration of one such disconnect system is illustrated in FIG. 4. As shown the terminals of the battery are connected to the common poles of a double pole-double throw switch or relay 203 that in one position applies the battery 204 directly to terminals 200 and 201 of the motor 7, or alternatively in the other position applies the battery 204 to terminals 50 and 51 of the motor control system.

Reversing of the motor is easily achieved by merely providing means well known to the art to reverse the polarity of the field. The control system will operate to control the truck when driving the truck in either direction. A typical reversing switching circuit is shown in FIG. 5 wherein the motor field winding 207 is connected by means of a conventional reversing switch 208 between the incoming power line 205 and the outgoing power line 206. Selective operation of this switch reverses the power flow through the field winding 207.

Because my system automatically limits the current through the traction motor, my invention naturally protects the motor and control system when the truck driver attempts to "plug" the motor. In addition, acceleration will be fully automatic. I achieve these things while enabling the truck to operate with extremely high efficiency, since my control system will eliminate power resistors, and will itself consume almost no power. Moreover, my speed control will reduce the cost of maintenance, because it requires no power contactors.

My system also enables a truck driver to have better control of an industrial truck because it contributes infinite speed control between zero and maximum speed. In addition, there will be better "inching" control, as is important in the operation of an industrial truck.

Having set forth and described with particularity the best mode of the invention known to me, it will be obvious to those skilled in the art that the system described herein is capable of various modifications, and is to be taken as illustrative rather than limiting within the spirit and scope of the invention.

I now claim:

1. A motor control system for an industrial truck having a battery and a D.C. traction motor, comprising:
    (a) a plurality of parallel connected power transistors for controlling the flow of current between the battery and the traction motor
    (b) means for equalizing the flow of current from said battery through each of said power transistors
    (c) means for supplying a pulsating current to said power transistors to cause said power transistors to intermittently conduct current from said battery to said motor to drive said traction motor
    (d) means for varying said pulsating current to vary the average conduction time of said power transistors to thereby vary the speed of the truck
    (e) means responsive to a predetermined rate of current through said motor for varying said pulsating current to decrease the average conduction time of said power transistors so as to prevent the rate of current through said motor from exceeding said predetermined rate, and
    (f) a unidirectional conductor connecting opposite sides of said traction motor to provide for flow of current during periods of non-conduction of said power transistors.

2. The combination of claim 1 wherein said current equalizing means consists of a toroid of transformer material, a separate winding on the toroid for each power transistor, each of said windings connected to its associated power transistor.

3. A power system for an industrial truck or the like, comprising:
    (a) a D.C. motor
    (b) a battery
    (c) transistor power supply means operated from said battery and producing pulses
    (d) rectifier means for obtaining a train of unidirectional pulses from said power supply
    (e) a transistor retriggerable delay flop driven by said unidirectional pulses and producing output pulses
    (f) means for varying the time constant of the retriggerable delay flop to vary the duty cycle of said output pulses and thereby vary the motor speed
    (g) transistor amplifier means operated from said transistor power supply means and coupled to said delay flop to amplify said output pulses
    (h) a plurality of parallel connected power transistors driven by the amplified output pulses and through which current flows between the battery and motor
    (i) means for equalizing the flow of current through said parallel connected power transistors
    (j) current sensing means for monitoring the motor current
    (k) a first current control transistor amplifier controlled by said sensing means and producing an output only when the motor current reaches a predetermined level
    (l) a second current control transistor amplifier driven by said first current control amplifier
    (m) a transistor trigger circuit fed by said second amplifier and which produces output pulses of opposite polarity to those driving said retriggerable delay flop, said trigger circuit being connected to said delay flop and decreasing the pulse duration of the output pulses from said delay flop when said motor current starts to exceed a predetermined level, and
(n) a rectifier connected across the motor and poled to provide a current path through the motor between pulse times.

4. The combination of claim 3 wherein said transistor power supply consists of:
(a) an oscillator generating a source of alternating voltage pulses
(b) transformer means having a plurality of primary and secondary windings, said primary windings forming part of the circuit of said oscillator, the secondary windings having different turn ratios to produce a plurality of output voltages, and
(c) rectifier means connected to said secondary windings to produce a plurality of direct current voltages.

5. A power system for an industrial truck, comprising:
(a) a battery
(b) a D.C. traction motor
(c) means operated from said battery to produce a train of unidirectional pulses
(d) transistor monostable circuit means having adjustable time constant elements operated from said battery and driven by said train of unidirectional pulses to produce output pulses for controlling the traction motor
(e) amplifying means operated from said battery for raising the power level of the pulses from said monostable circuit means to drive said traction motor
(f) means for varying said time constant elements of the monostable circuit means to control the time duration of said unidirectional pulses and thereby vary the truck speed, and
(g) transistor means operated from said battery for monitoring the current supplied to the motor and producing signals to control said monostable circuit means so as to decrease the time duration of said output pulses when the motor current starts to exceed a predetermined level.

6. A pulse width modulation system for controlling the speed of D.C. traction motors comprising:
(a) a battery
(b) transistor pulse generating means operated from said battery, having a time constant element and capable of having the pulse duration of the output pulses controlled both by varying said time constant element and by input pulses
(c) transistor amplifying means operated from said battery for raising the output level of pulses supplied by said pulse generating means to a sufficient power level to drive the traction motor
(d) means for controlling the time constant of said pulse generating means so as to control the speed of the motor
(e) a unidirectional element connected across said traction motor to provide a current path between pulses
(f) means for monitoring the motor current and operated from said battery for producing pulses to prematurely terminate the pulse duration of the output pulses from said pulse generating means when the traction motor current reaches a predetermined level.

7. The combination of claim 6 wherein said means for monitoring the motor current and producing pulses to control the pulse duration of the output pulses includes:
(a) a sensing element in series with the traction motor
(b) a transistor amplifier with input and output means having its input means connected to said sensing element and arranged to be in one conductive state until the sensed motor current pulses reach a predetermined level
(c) a second transistor amplifier with input and output means having the input means connected to the output means of said first transistor
(d) a pair of transistors arranged as a trigger circuit having input and output means, said input means connected to the input of said second transistor, said trigger circuit producing control pulses which are fed to said pulse generating means to decrease the pulse duration of the output pulses from said pulse generating means.

8. A motor control system for an industrial truck having a battery and a D.C. series field traction motor, comprising:
(a) transistor switch means alternately connecting and disconnecting the traction motor to the battery
(b) means for varying the duty cycle of the transistor switch means so as to control the motor speed
(c) a rectifier connected across said traction motor and poled to provide a path for the flow of motor current during the time the battery is not connected to the motor
(d) means for monitoring the motor current and producing signals to retard the duty cycle of the switch means when the motor current reaches a predetermined level
(e) means for disconnecting said transistor switch and monitoring means and connecting said traction motor directly across the battery, and
(f) means for reversing the motor field polarity.

9. In a speed control system for an industrial truck having a power storage battery,
(a) a D.C. traction motor,
(b) switch means for applying variable duty cycle drive impulses to said motor from said battery, said switch means comprising:
(c) an oscillator,
(d) a control pulse producing circuit triggered by the cycles of said oscillator for producing control pulses of adjustable time duration,
(e) a switching circuit energized by said control pulses for applying said drive impulses from said battery to said motor during the time interval of said control pulses,
(f) and an adjustable feedback pulse generator circuit triggered by the amplitude of current through said motor during said drive impulses exceeding a preset amplitude for triggering said control circuit to terminate the control pulse then being produced prior to its normal termination.

10. In the speed control system of claim 9, manually controlled means for said control circuit for adjusting the duration of the control pulses thereby to control the duration of the drive pulses applied to the motor.

11. In the speed control system of claim 10, additional manually controlled means for said feedback pulse generator circuit for preselecting the amplitude of motor current required to trigger said feedback pulse generator circuit.

12. A control system for energizing a D.C. traction motor from a power storage battery by variable duty cycle impulses comprising:
(a) a traction motor,
(b) a storage battery,
(c) cyclically operating transistor switch means for applying D.C. drive pulses from the battery to energize said motor,
(d) manual control means for adjusting the time duration of said drive pulses,
(e) and feedback pulse producing means responsive to the amplitude of current through said motor exceeding a preset amplitude during any one of said drive pulses for producing a feedback pulse to said transistor switch means for prematurely terminating the operation of said transistor switch means in advance of its normal time duration.

13. In the motor control system of claim 12, the addition of manual control means for adjusting said feedback pulse producing means to respond to different preset amplitudes of current through said motor.

(References on following page)

References Cited by the Examiner

UNITED STATES PATENTS

| | | | |
|---|---|---|---|
| 2,882,482 | 4/1959 | Simkins | 323—9 |
| 3,040,238 | 6/1962 | Tadleo | 323—9 |
| 3,050,672 | 8/1962 | Alexanderson | 318—257 |
| 3,064,175 | 11/1962 | Vergez | 318—341 |
| 3,084,319 | 4/1963 | Hooijkamp | 318—332 |
| 3,092,766 | 6/1963 | Hansen | 318—341 |

ORIS L. RADER, *Primary Examiner.*

S. GORDON, J. C. BERENZWEIG, *Assistant Examiners.*